US012640513B2

(12) United States Patent
Ma et al.

(10) Patent No.: US 12,640,513 B2
(45) Date of Patent: May 26, 2026

(54) CONNECTOR CAGE ASSEMBLY

(71) Applicant: Tyco Electronics (Shanghai) Co., Ltd., Shanghai (CN)

(72) Inventors: Yongfeng (Richard) Ma, Shanghai (CN); Wenyu (Vindy) Liu, Shanghai (CN); Guangming (Suny) Zhao, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 681 days.

(21) Appl. No.: 18/150,233

(22) Filed: Jan. 5, 2023

(65) Prior Publication Data

US 2023/0216234 A1 Jul. 6, 2023

(30) Foreign Application Priority Data

Jan. 5, 2022 (CN) ......................... 202210012051.0

(51) Int. Cl.
*H01R 13/518* (2006.01)

(52) U.S. Cl.
CPC .................................. *H01R 13/518* (2013.01)

(58) Field of Classification Search
None
See application file for complete search history.

(56) References Cited

U.S. PATENT DOCUMENTS 3,121,386 A * 2/1964 Persinger ............ A47J 37/0704 99/446
7,075,796 B1 * 7/2006 Pritchett ................. G06F 1/185 361/756
7,575,471 B2 * 8/2009 Long .................... G02B 6/0001 439/541.5
8,636,544 B1 * 1/2014 Briant .................. H01R 13/514 439/607.25
2013/0034992 A1 * 2/2013 Phillips .............. H01R 13/6581 439/527

FOREIGN PATENT DOCUMENTS

CN 110896176 A * 3/2020 ......... H05K 7/20145
JP 3121386 U * 5/2006 ......... H01R 12/7005

OTHER PUBLICATIONS

Lang et. al (JP 3121386 U) (Year: 2006).*
Scholeno et. al (CN 110896176 A) (Year: 2020).*

* cited by examiner

*Primary Examiner* — Hung S. Bui
*Assistant Examiner* — Elisa Sasserath
(74) *Attorney, Agent, or Firm* — Barley Snyder

(57) ABSTRACT

A connector cage assembly includes a housing, an intermediate member, a heat sink and a movable stop member. The housing defines upper and lower plug sockets stacked in a vertical direction. The intermediate member is arranged between the upper socket and the lower socket, and the heat sink is arranged adjacent the intermediate member. The stop member is movable within the housing between a first position in which it is positioned at a first distance from the heat sink, and a second position in which it is positioned at a second distance from the heat sink, greater than the first distance. The stop member is adapted to limit the insertion of a plug connector inserted into the lower plug socket.

20 Claims, 5 Drawing Sheets

CONNECTOR CAGE ASSEMBLY

CROSS-REFERENCE TO RELATED APPLICATIONS

This application claims the benefit of Chinese Patent Application No. CN 202210012051.0 filed on Jan. 5, 2022, in the China National Intellectual Property Administration, the whole disclosure of which is incorporated herein by reference.

FIELD OF THE INVENTION

Embodiments of the present disclosure generally relate to electrical connectors, and more particularly, to a connector cage assembly.

BACKGROUND

Existing laminated connector assemblies include a laminated connector cage assembly and a laminated connector body separately installed therein. In certain applications, the connector is installed on a circuit board by surface mount technology (SMT). The cage assembly is then installed on the circuit board by pressing. In some applications, the connector cage assembly and the connector body define a split structure having upper and lower ports. During assembly, existing plug insertion limiting structures of the lower port (also known as the "lower socket") of the cage assembly often interfere with the SMT type connector, which is a technical problem needed to be solved in the art.

In addition, in order to solve heat dissipation challenges, a heat sink is provided respectively above the upper port (also known as the "upper socket") and above the lower port. The heat sink above the lower port is provided adjacent to an intermediate member for separating the upper port and the lower port from each other. In the existing products, the layout of the lower heat sink above the lower port also brings technical difficulty to the design of the insertion limit structure of the lower port.

SUMMARY

According to an embodiment of the present disclosure, a connector cage assembly comprises a housing, an intermediate member, a heat sink and a movable stop member. The housing defines upper and lower plug sockets stacked in a vertical direction. The intermediate member is arranged between the upper socket and the lower socket, and the heat sink is arranged adjacent the intermediate member. The stop member is movable within the housing between a first position in which it is positioned at a first distance from the heat sink, and a second position in which it is positioned at a second distance from the heat sink, greater than the first distance. The stop member limits the insertion of a plug connector into the lower plug socket.

BRIEF DESCRIPTION OF THE DRAWINGS

The invention will now be described by way of example with reference to the accompanying Figures, of which.

DETAILED DESCRIPTION OF THE EMBODIMENTS

Figure 1:
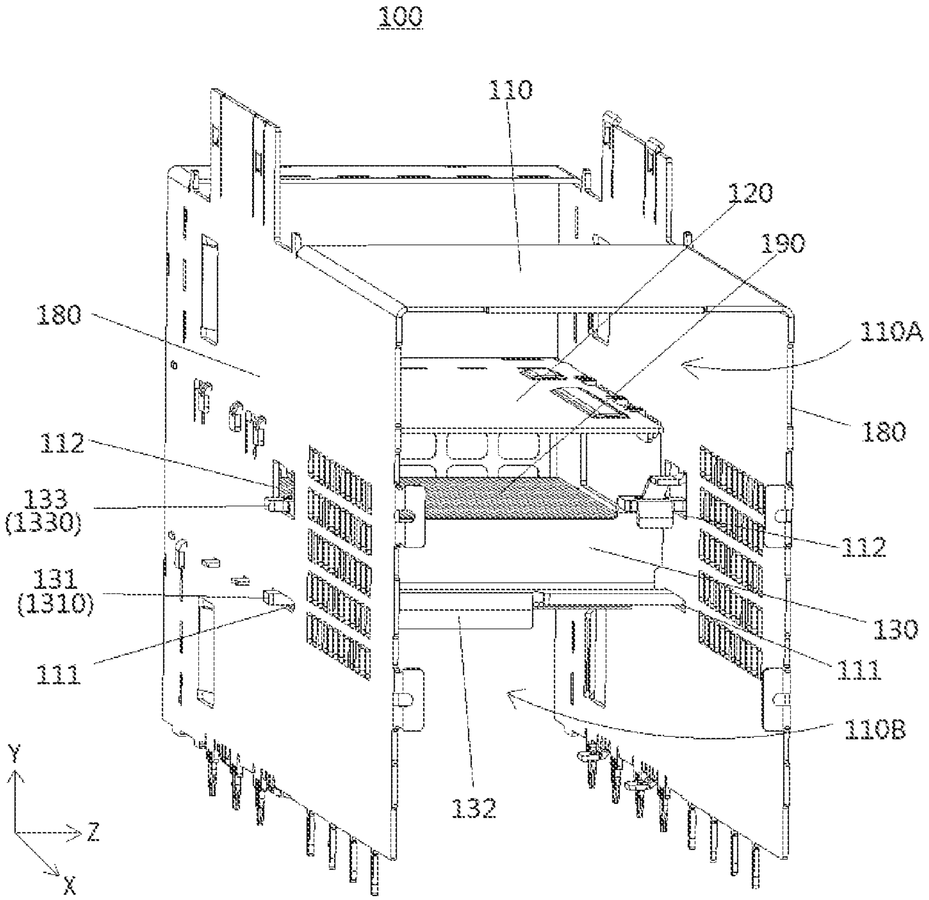
FIG. 1 shows a schematic perspective view of a connector cage assembly according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a connector cage assembly includes a housing, an intermediate member and a heat sink. The housing defines an upper socket and a lower socket that are stacked from each other in a vertical or up-down direction. The intermediate member positioned between the upper socket and the lower socket in the vertical direction. The heat sink is abutted against the intermediate member in a front-rear direction perpendicular to the vertical direction. The connector cage assembly further includes a movable stop member. The movable stop member is movably mounted in the housing and can move between a first position in which the movable stop member is adjacent to the heat sink, and a second position in which the movable stop member is away from the heat sink. The stop member is adapted to limit an insertion depth of a plug connector inserted into the lower socket.

In the illustrated exemplary embodiment, as shown in FIGS. 1-8, a connector cage assembly 100 includes a housing 110, an intermediate member 120 and a heat sink 190. The housing 110 defines an upper socket 110A and a lower socket 110B that are stacked from each other in the vertical direction Y. The intermediate member 120 is provided between the upper socket 110A and the lower socket 110B in the vertical direction Y. The heat sink 190 is abutted against the intermediate member 120 in a front-rear direction X perpendicular to the vertical direction Y.

The connector cage assembly 100 further includes a movable stop member 130. The movable stop member 130 is movably provided in the housing 110 and can move between a first position P1 and a second position P2 in the front-rear direction X, wherein the movable stop member 130 is adjacent to the heat sink 190 in the first position P1, and the movable stop member 130 is away from the heat sink 190. The stop member 130 is adapted to limit an insertion depth of a plug connector 200. See, for example, FIG. 5 wherein the plug connector 200 is shown inserted into the lower socket 110B in the second position P2. The plug connector to be plugged into the upper socket 110A is omitted.

It should be noted that for the sake of description, a direction in which the plug connector 200 is inserted into the sockets 110A, 110B and the plug connector 200 is pulled out from the sockets 110A, 110B is defined as the front-rear direction X (wherein, in the front-rear direction X, the direction in which the plug connector 200 is inserted is a front direction and the direction in which the plug connector 200 is pulled out is a rear direction). A direction in which the upper and lower sockets 110A and 110B of the shousing 110 are stacked is defined as the vertical or up-down direction Y, and a direction perpendicular to both the front-rear direction X and the vertical direction Y described above is defined as the left-right direction Z. It should be noted that the "heat sink" described herein mainly refers to a lower heat sink for heat dissipation at the lower socket.

According to the connector case assembly provided in the illustrated embodiment, the movable stop member is provided adjacent to the heat sink to function a limit effect on a plug connector inserted into the lower socket. The movable stop member is movable relative to the housing between the first position adjacent to the heat sink and the second position far away from the heat sink in the insertion direction (i.e., the front-rear direction) of the plug connector. In the first position, the movable stop member will not interfere with the assembly of an SMT type connector. In the second position, the movable stop member can effectively function the limit effect on the plug connector in order to solve the technical problem that existing insertion limit structures of the lower socket of the current laminated connector cage assembly will interference with the assembly of the SMT type connector.

Figure 2:
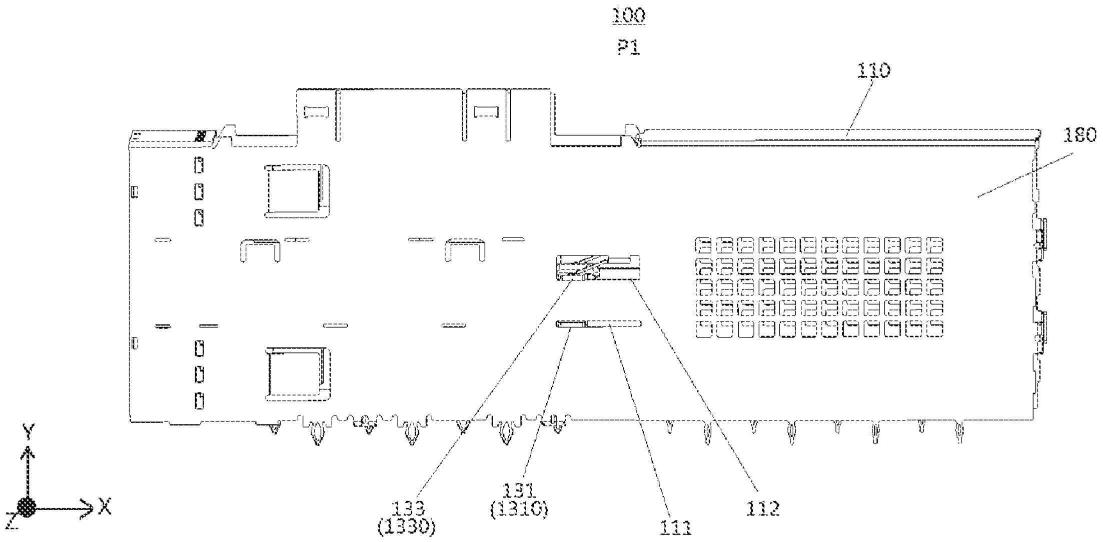
FIG. 2 shows a schematic side view of the connector cage assembly shown in FIG. 1, wherein a movable stop member is in a first position.
Figure 3:
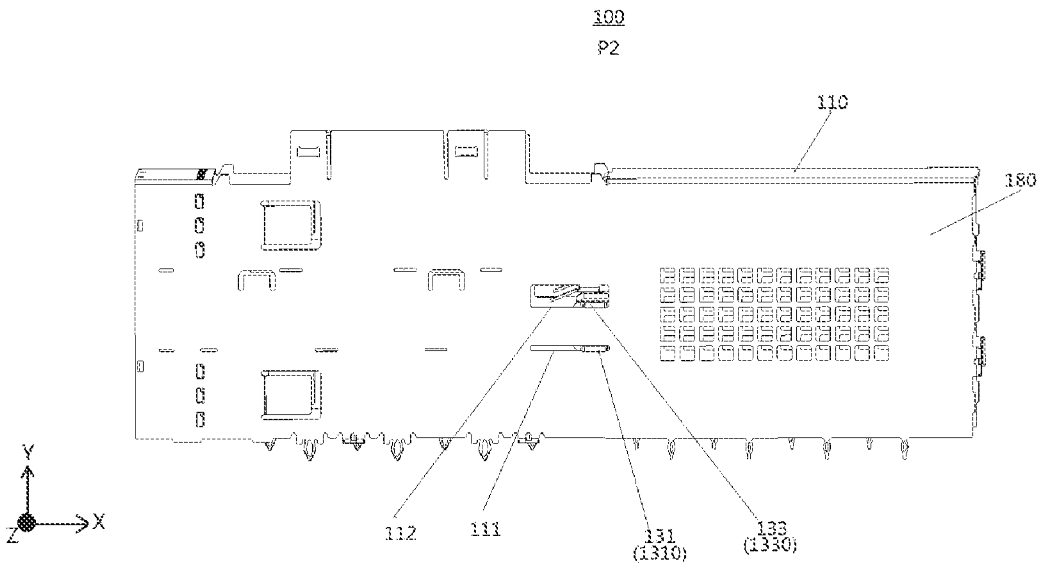
FIG. 3 shows a schematic side view of the connector cage assembly shown in FIG. 1, wherein the movable stop member is in a second position.
Figure 4:
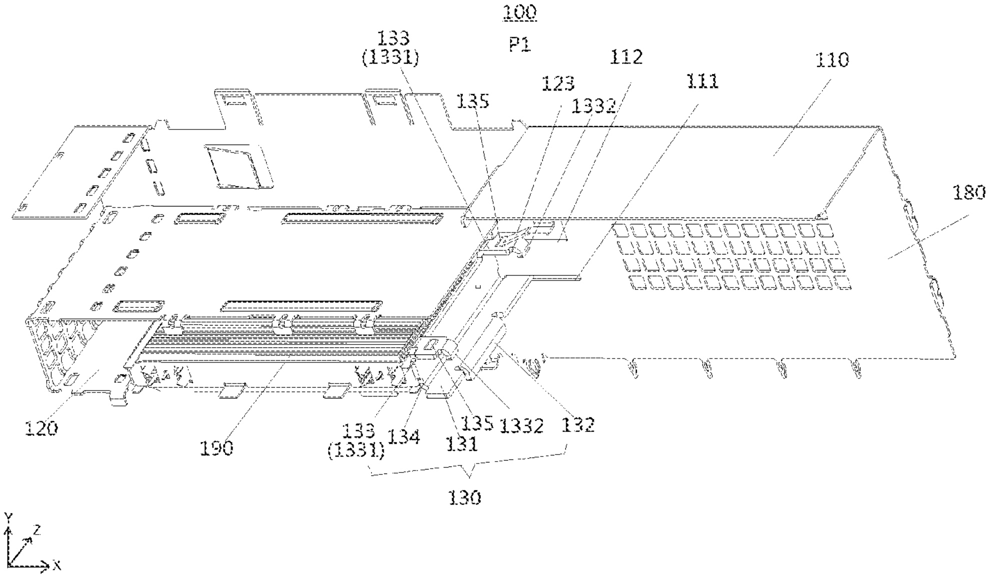
FIG. 4 shows a schematic perspective view of the connector cage assembly shown in FIG. 1, in which a part of a housing is omitted to show an internal structure, wherein the movable stop member is in the first position.
Figure 7:
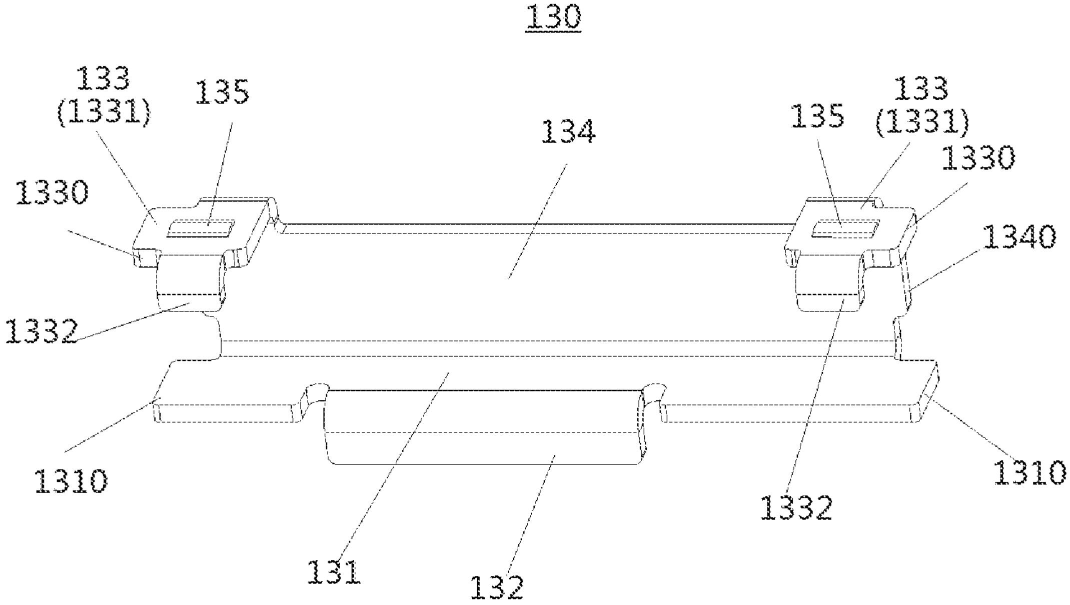
FIG. 7 shows a schematic view of an embodiment of the movable stop member shown in FIG. 6.
Figure 8:
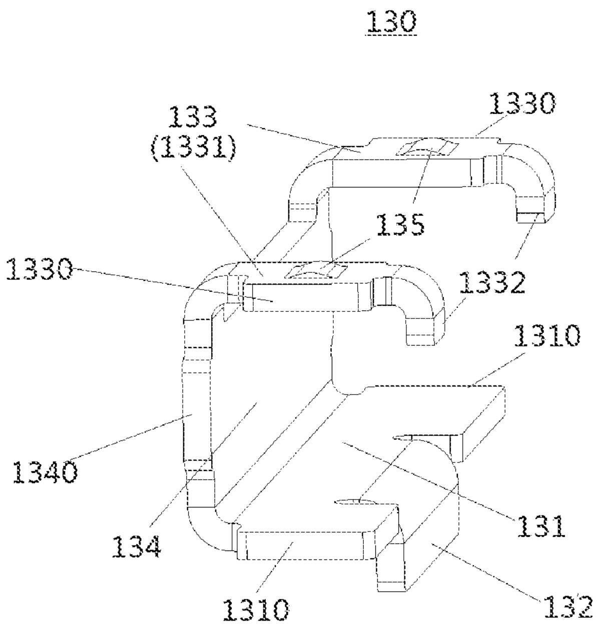
FIG. 8 shows a schematic perspective view of the movable stop member shown in FIG. 7 from another view.

More specifically, and still referring to FIGS. 1-8, the movable stop member 130 includes: a first portion 131 extending in the front-rear direction X; a second portion 134 bent and extending upward from a back side of the first portion 131 in the vertical direction Y, wherein the second portion 134 is abutted against the heat sink 190 when the removable stop member 130 is in the first position P1 (as shown in FIG. 4); a third portion 133 bent and extending forward from a upper side of the second portion 134 in the front-rear direction X; and a stop portion 132 bent and extending downward from a front side of the first portion 131 in the vertical direction Y, wherein the stop portion 132 extends into the lower socket 110B for stopping the plug connector 200 inserted into the lower socket 110B. A cross section of the movable stop member 130 may be C-shaped. Specifically, as shown in FIG. 8, the cross section, which is perpendicular to the left-right direction Z, of the first portion 131, the second portion 134 and the third portion 133 of the movable stop member 130 is C-shaped.

The housing includes a first sliding slot 111 that is opened in left and right sidewalls 180 of the housing 110, respectively. The first sliding slot 111 extends in the front-rear direction X. An end side 1310 of the first portion 131 in the left-right direction Z perpendicular to both the front-rear direction X and the vertical direction Y is movably supported in the respective first sliding slot 111. The housing 110 further includes a second sliding slot 112 that is opened respectively in the left and right sidewalls 180 of the housing 110. The second sliding slot 111 extends in the front-rear direction X and being located above the first sliding slot 111. An end side 1330 of the third portion 133 of the movable stop member 130 in the left-right direction Z is movably supported in the second sliding slot 112.

Figure 5:
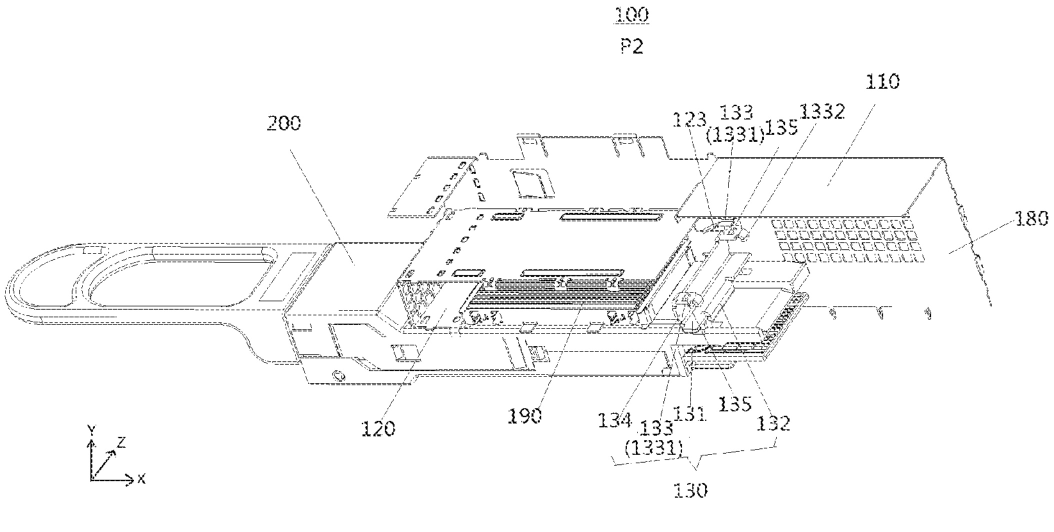
FIG. 5 shows a schematic perspective view of the connector cage assembly shown in FIG. 1, in which a part of the housing is omitted to show an internal structure, wherein a plug connector has been inserted into a lower socket and the movable stop member is in the second position.
Figure 6:
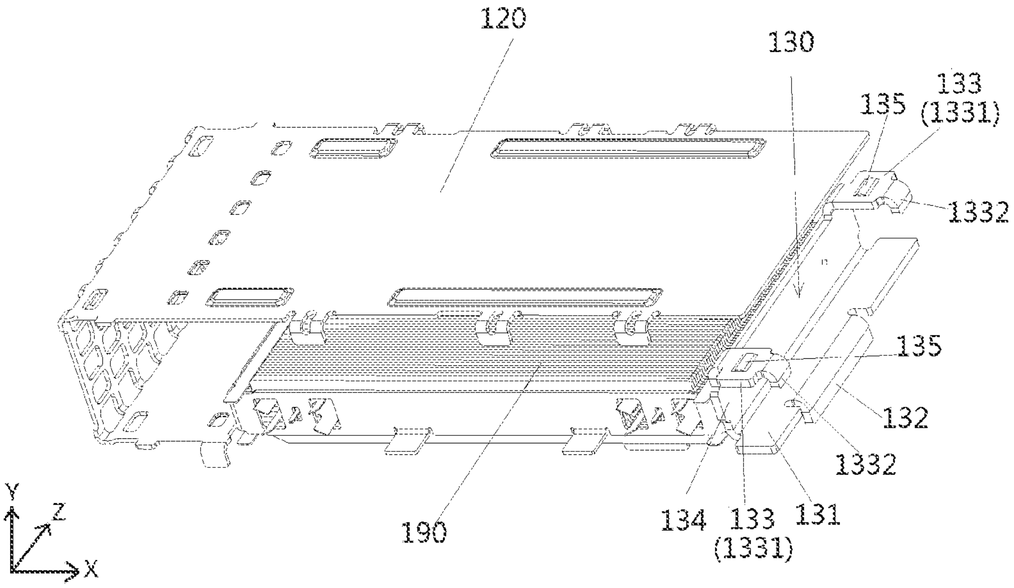
FIG. 6 shows a schematic perspective view of an intermediate member, a heat sink, and the movable stop member of the connector cage assembly shown in FIG. 1, wherein the movable stop member is in the first position.

In the connector cage assembly provided by the exemplary embodiment of the present disclosure, the movable stop member 130 is moved relative to the housing 110 by sliding the first portion 131 relative to the first sliding slot 111 and/or sliding the third portion 133 relative to the second sliding slot 112 to realize the switch of the movable stop member 130 between the first position P1 and the second position P2. In this way, during the insertion of the plug connector 200 into the lower socket 110B, the movable stop member 130 switches from the first position P1 as shown in FIGS. 2 and 4 to the second position as shown in FIGS. 3 and 5 to realize the limit effect on the plug connector 200.

In a state where the movable stop member 130 is located in the first position P1 (as shown in FIGS. 2 and 4), the first portion 131 is supported at one end of the first sliding slot 111. In a state where the moveable stop member 130 is located at the second position P2 (as shown in FIGS. 3 and 5), the first portion 131 is supported at the opposite other end of the first sliding slot 111. A moving range of the movable stop member 130, i.e., the first position P1 and the second position P2, can be determined by the positioning and length of the first sliding slot 111.

The third portion 133 of the movable stop member 130 further includes two cantilevers 1331 extending in the front-rear direction X and separated from each other in the left-right direction Z. By symmetrical design of the two cantilevers 1331 on both sides of the Z direction, the stability of the movement of the movable stop member 130 relative to the housing 110 can be improved. Of course, in the embodiment not shown, the third portion 133 of the movable stop member 130 may also be entirely bent and extend forward from the upper side of the portion 134 in the front-rear direction X, i.e., it may be a plate structure similar to the second portion 134, rather than the cantilever only bent and extending forward from two sides of the upper side of the second portion 134 in the Z direction.

Further, each cantilever 1331 of the moveable stop member 130 includes a reinforcing rib 135 protruding upward from the corresponding cantilever 1331 in the vertical direction Y. The housing 100 includes an abutting clip 123 formed by bending from the first sliding slot 111 of the housing 110 toward an interior of the housing 100. The clip 123 is inclined downward in the vertical direction Y. The reinforcing rib 135 and the abutting clip 123 are adapted such that the abutting clip 123 is abutted against the reinforcing rib 135 to prevent the movable stop member 130 from sliding freely relative to the housing 110 when the movable stop member 130 is in the first position P1. The reinforcing rib 135 protrudes upward from at least part of the corresponding cantilever 1331. Thus, the reinforcing rib 135 does not run through the entire cantilever 1331 in the Z direction, as shown in FIGS. 7 and 8.

Figure 9:
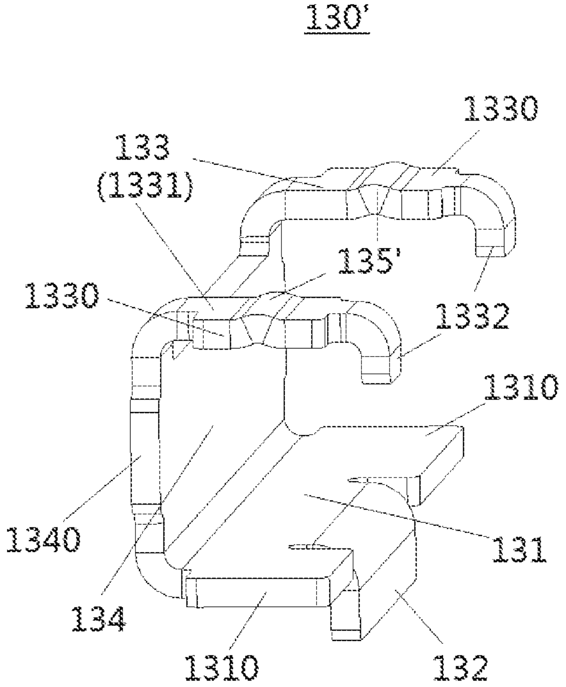
FIG. 9 shows a schematic view of another embodiment of the movable stop member shown in FIG. 6.

In another exemplary embodiment shown in FIG. 9, the structure of the movable stop member 130' is essentially the same as that of the movable stop member 130 in the embodiment shown in FIGS. 7 and 8, with the reinforcing rib 135' being unique. Specifically, the reinforcing rib 135' protrudes upward from the entirely corresponding cantilever 1331. In this way, the reinforcing ribs 135' run through the entire cantilever 1331 in the Z direction. Furthermore, in the exemplary embodiment, the abutting clip 123 may be formed by bending a portion that was cut when the second sliding slot 112 was formed in the sidewall of the housing 110.

It should be noted that the abutting cooperation between the reinforcing rib 135 and the abutting clip 123 described herein is not designed to completely prevent the sliding of the movable stop member 130 relative to the housing 110. Rather it is designed to prevent the undesired sliding of the movable stop member 130 relative to the housing 110 in case of an accident, by way of example. Specifically, the abutting force between the reinforcing rib 135 and the abutting clip 123 may be less than or equal to a certain preset value, such as 5N. Therefore, when the plug connector 200 is inserted into the lower socket 110B with a conventional force (the plug connector 200 is usually inserted with a force greater than 5N), the insertion force of the plug connector 200 will overcome the abutting force between the reinforcing rib 135 and the abutting clip 123 to smoothly insert into the lower socket 110B and force the movable stop member 130 to move from its first position P1 to its second position P2. According to the connector cage assembly provided by the embodiments of the present disclosure, the sliding resistance of the movable stop member relative to the housing is appropriately increased by the abutting cooperation between the abutting clip provided on the housing 110 and the reinforcing rib formed on the movable stop member. This arrangement prevents the movable stop member from sliding freely relative to the housing.

A front end of each cantilever 1331 is bent and extends downward in the up-down direction Y to form an abutting portion 1332. The abutting portions 1332 of the two cantilevers 1331 are adjacent to the left and right sidewalls 180 of the housing 110, respectively. In this way, undesired bias and displacement of the movable stop member 130 during the movement due to the inconsistent movement of the two cantilevers 1331 can be prevented by the abutting portions 1332 of the two cantilevers 1331 being adjacent to the left and right sidewalls 180 of the housing 110, respectively.

The second portion 134 of the movable stop member 130 is located entirely within an interior of the housing 110, and the end sides 1340 of the second portion 134 in the left-right direction Z are adjacent to the left and right sidewall 180 of the housing 110, respectively. In this way, undesired bias and displacement of the movable stop member 130 during the movement due to the inconsistent movement of the two cantilevers 1331 can be further prevented by the end sides 1340 of the second portion 134 in the left-right direction Z being adjacent to the left and right sidewall 180 of the housing 110, respectively.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector cage assembly, comprising:
- a housing defining an upper socket and a lower socket stacked relative to one another in a vertical direction;
- an intermediate member arranged between the upper socket and the lower socket in the vertical direction;
- a heat sink arranged adjacent the intermediate member; and
- a stop member movable within the housing between a first position at a first distance from the heat sink, and a second position at a second distance from the heat sink greater than the first distance, the stop member adapted to limit an insertion of a plug connector inserted into the lower socket.

2. The connector cage assembly according to claim 1, wherein the housing defines at least one slot slidably supporting the stop member between the first and second positions.

3. The connector cage assembly according to claim 1, wherein the stop member includes a stop portion extending vertically into the lower socket and positioned to stop the plug connector.

4. The connector cage assembly of claim 3, wherein the movable stop member further comprises:
- a first portion extending in a direction of insertion of the plug connector, the stop portion extending downward therefrom;
- a second portion bent and extending vertically upward from the first portion and abutting against the heat sink when the stop member is in the first position; and
- a third portion extending forward from the second portion in the plug insertion direction, the stop portion extending from the first portion.

5. The connector cage assembly of claim 4, wherein the at least one slot of the housing includes a first sliding slot formed through lateral sidewalls of the housing and extending in the plug insertion direction.

6. The connector cage of claim 5, wherein ends of the first portion of the stop member are movably supported in the first sliding slot.

7. The connector cage assembly according to claim 6, wherein the housing further defines a second sliding slot formed through the lateral sidewalls, the second sliding slot extending in the plug insertion direction and arranged above the first sliding slot.

8. The connector cage assembly according to claim 7, wherein ends of the third portion of the stop member are movably supported in the second sliding slot.

9. The connector cage assembly according to claim 4, wherein the third portion of the stop member includes two cantilevers extending in the plug insertion direction.

10. The connector cage assembly according to claim 9, wherein each cantilever further includes a protruding reinforcing rib.

11. The connector cage assembly according to claim 10, wherein the housing further includes a pair of clips engaging with a respective one of the reinforcing ribs and preventing the stop member from sliding freely relative to the housing when the stop member is in the first position, an engaging force between the reinforcing rib and the clip is less than 5N.

12. The connector cage assembly according to claim 11, wherein the pair of clips are formed by bending the lateral sidewalls in the area of the first sliding slot of the housing toward an interior of the housing, the clips inclining in a vertically downward direction.

13. The connector cage assembly according to claim 12, wherein each reinforcing rib protrudes upward from a respective one of the cantilevers.

14. The connector cage assembly according to claim 9, wherein a front end of each cantilever extends in a downward vertical direction to form an abutting portion, the abutting portions of the two cantilevers being adjacent to a respective one of the lateral sidewalls of the housing.

15. The connector cage assembly according to claim 4, wherein the second portion of the movable stop member is located entirely in an interior of the housing.

16. The connector cage assembly according to claim 1, wherein the stop member is movable in a direction of insertion of the plug connector between the first and second positions.

17. The connector cage assembly according to claim 16, wherein:

the at least one slot slidably supports the stop member for movement in the direction of insertion of the plug connector between the first and second positions; and a portion of the stop member is slidable supported within the at least one slot of the housing.

18. A connector cage assembly, comprising:

a housing defining a plug socket and at least one guide slot formed through a wall of the housing;

a movable stop slidably arranged in the guide slot and movable in a direction of insertion of a plug into the plug socket between a first position and a second position, a portion of the movable stop extending into the plug socket and positioned to be biased between the first position and the second position by a plug inserted into the plug socket; and a catch holding the movable stop in the first position until the application of a predetermined force of less than 5N on the movable stop in the direction of insertion of the plug.

19. The connector cage according to claim 18, wherein:

the stop member includes at least one cantilever extending in the plug insertion direction, the at least one cantilever including a protruding reinforcing rib; and the catch includes a clip engaging with the reinforcing rib and preventing the stop member from sliding freely relative to the housing when the stop member is in the first position, wherein an engaging force between the reinforcing rib and the clip is less than 5N.

20. A connector cage assembly, comprising:

a housing defining an upper socket and a lower socket stacked relative to one another in a vertical direction;

an intermediate member arranged between the upper socket and the lower socket in the vertical direction;

a heat sink arranged adjacent the intermediate member; and a stop member movable within the housing between a first position at a first distance from the heat sink, and a second position at a second distance from the heat sink greater than the first distance, the stop member having a C-shaped cross section and adapted to limit an insertion of a plug connector inserted into the lower socket.

* * * * *